(12) United States Patent
Berroth

(10) Patent No.: US 9,139,118 B2
(45) Date of Patent: Sep. 22, 2015

(54) VENTILATING DEVICE

(75) Inventor: Hansjoerg Berroth, VS-Obereschach (DE)

(73) Assignee: EBM-PAPST ST. GEORGEN GmbH & Co. KG, St. Georgen (DE)

( * ) Notice: Subject to any disclaimer, the term of this patent is extended or adjusted under 35 U.S.C. 154(b) by 0 days.

(21) Appl. No.: 13/979,652

(22) PCT Filed: Mar. 15, 2012

(86) PCT No.: PCT/EP2012/001150
§ 371 (c)(1),
(2), (4) Date: Jul. 14, 2013

(87) PCT Pub. No.: WO2012/130395
PCT Pub. Date: Oct. 4, 2012

(65) Prior Publication Data
US 2013/0300159 A1    Nov. 14, 2013

(30) Foreign Application Priority Data

Mar. 30, 2011 (DE) .......................... 10 2011 016 136

(51) Int. Cl.
*B60N 2/56* (2006.01)

(52) U.S. Cl.
CPC ............ *B60N 2/5642* (2013.01); *B60N 2/5635* (2013.01); *B60N 2/5657* (2013.01)

(58) Field of Classification Search
CPC .. B60N 2/5635; B60N 2/5642; B60N 2/5657; B60N 2/5685; A47C 7/74; B60H 1/00285
USPC ................ 297/180.14, 180.13, 180.1, 180.12
See application file for complete search history.

(56) References Cited

U.S. PATENT DOCUMENTS

| | | | |
|---|---|---|---|
| 6,196,627 B1 | 3/2001 | Faust et al. ................ | 297/180.14 |
| 6,604,785 B2* | 8/2003 | Bargheer et al. ......... | 297/180.14 |
| 6,869,140 B2 | 3/2005 | White et al. ............. | 297/180.13 |
| 2004/0139758 A1 | 7/2004 | Kamiya et al. ................. | 62/244 |
| 2004/0164594 A1* | 8/2004 | Stoewe et al. ............ | 297/180.14 |
| 2006/0103183 A1* | 5/2006 | White et al. ............. | 297/180.14 |
| 2006/0138812 A1* | 6/2006 | Aoki ........................ | 297/180.14 |
| 2007/0176471 A1* | 8/2007 | Knoll ....................... | 297/180.14 |
| 2008/0111403 A1 | 5/2008 | Ulbrich et al. ........... | 297/180.12 |
| 2008/0191521 A1* | 8/2008 | Bajic et al. .............. | 297/180.12 |

(Continued)

FOREIGN PATENT DOCUMENTS

| | | |
|---|---|---|
| DE | 198 05 174 C | 6/2002 |
| DE | 202005-007453 | 10/2005 |
| DE | 102005-008 596 A | 5/2006 |

(Continued)

*Primary Examiner* — Milton Nelson, Jr.
(74) *Attorney, Agent, or Firm* — Milton Oliver, Esq.; Oliver Intellectual Property LLC

(57) ABSTRACT

A ventilation apparatus (500) serves to cool the seat cushion (120) of a seat (100), in particular of a vehicle seat. This seat cushion (120) has a seating surface (122), a rear face (127) and an underside (121). The underside (121) of the seat cushion (120) and the seat frame (110) form a cavity (190). The ventilation apparatus (500) has a radial fan (515) for arrangement in said cavity (190), which radial fan (515) has an inlet (512) and an outlet (518). An air distribution arrangement (530) connects to the output of a U-shaped air deflection device (520) that extends from the air outlet (518) of the radial fan (515) to an inlet (532) of the air distribution arrangement (530) and includes a plurality of air deflection conduits (525).

19 Claims, 5 Drawing Sheets

(56) References Cited

U.S. PATENT DOCUMENTS

| | | | |
|---|---|---|---|
| 2008/0315634 A1 | 12/2008 | Hartmann et al. | 297/180.14 |
| 2009/0015043 A1 | 1/2009 | Macht et al. | 297/180.14 |
| 2009/0028534 A1 | 1/2009 | Hartmann et al. | 392/485 |
| 2009/0134675 A1 | 5/2009 | Pfahler | |
| 2009/0134677 A1 | 5/2009 | Maly et al. | 297/180.1 |

FOREIGN PATENT DOCUMENTS

| | | |
|---|---|---|
| DE | 202007-008484 | 4/2008 |
| DE | 102006-051703 | 5/2008 |
| DE | 102006-054860 | 5/2008 |
| DE | 202007-008310 | 10/2008 |
| WO | WO 02-053411 A | 7/2002 |

* cited by examiner

VENTILATING DEVICE

FIELD OF THE INVENTION

The invention relates to a ventilation apparatus for arrangement on the seat cushion of a seat, in particular of a vehicle seat.

BACKGROUND

Ventilation apparatuses of this kind can be utilized for ventilation of seats of all kinds, and must be adapted to a respectively available installation space. With sports-car seats in particular, however, the respectively available installation space is highly limited so that, as a rule, only ventilation apparatuses having reduced dimensions can be utilized.

DE 10 2006-054 860 A1, HEINL et al., shows a subassembly for a seat having a core, in which subassembly the conduits are arranged on the first side of the seat and a fan is arranged on the second side of the seat, the conduits and the fan being flow-connected. Either the core is introduced into a correspondingly configured depression of the seat, or the core is constituted by the seat itself. In the core, openings are provided between the first side and the second side. Spacing elements are constituted by a pultruded spiral which is made of a material that is stiffer than the material of the core. The spacing elements are encased by a separate nonwoven-fabric layer. The separate nonwoven-fabric layer has openings so that air, to be drawn in or discharged, can flow between the inner side and outer side of the separate nonwoven-fabric layer. The spacing elements extend on the first side in a collector conduit, and then dip through the core to the second side. On the second side, the spacing elements open into a connecting member that is connected via snap connectors to the fan.

SUMMARY OF THE INVENTION

It is therefore an object of the invention to make available a novel seat ventilation apparatus with fewer fan-size constraints.

This object is achieved by a ventilation apparatus wherein the seat frame and the seat cushion's underside define a cavity in which a fan module is mountable, with the air flow generated by the fan module being directed along a U-shaped path around a rear edge of the cushion, for application to the seating surface. Optionally, the air distribution end of this assembly can include a resistance heating coil. Here, an air stream generated by a radial fan is deflected by means of an air deflection device and is delivered to an air distribution arrangement for planar distribution of the deflected air stream. In conjunction with the air deflection device, a reduction in the overall dimensions of the ventilation apparatus can thus be enabled, especially when a comparatively large-area, slow-rotating radial fan is used.

BRIEF FIGURE DESCRIPTION

Further details and advantageous refinements of the invention are evident from the exemplifying embodiments, in no way to be understood as a limitation of the invention, that are described below and depicted in the drawings.

Figure 1:
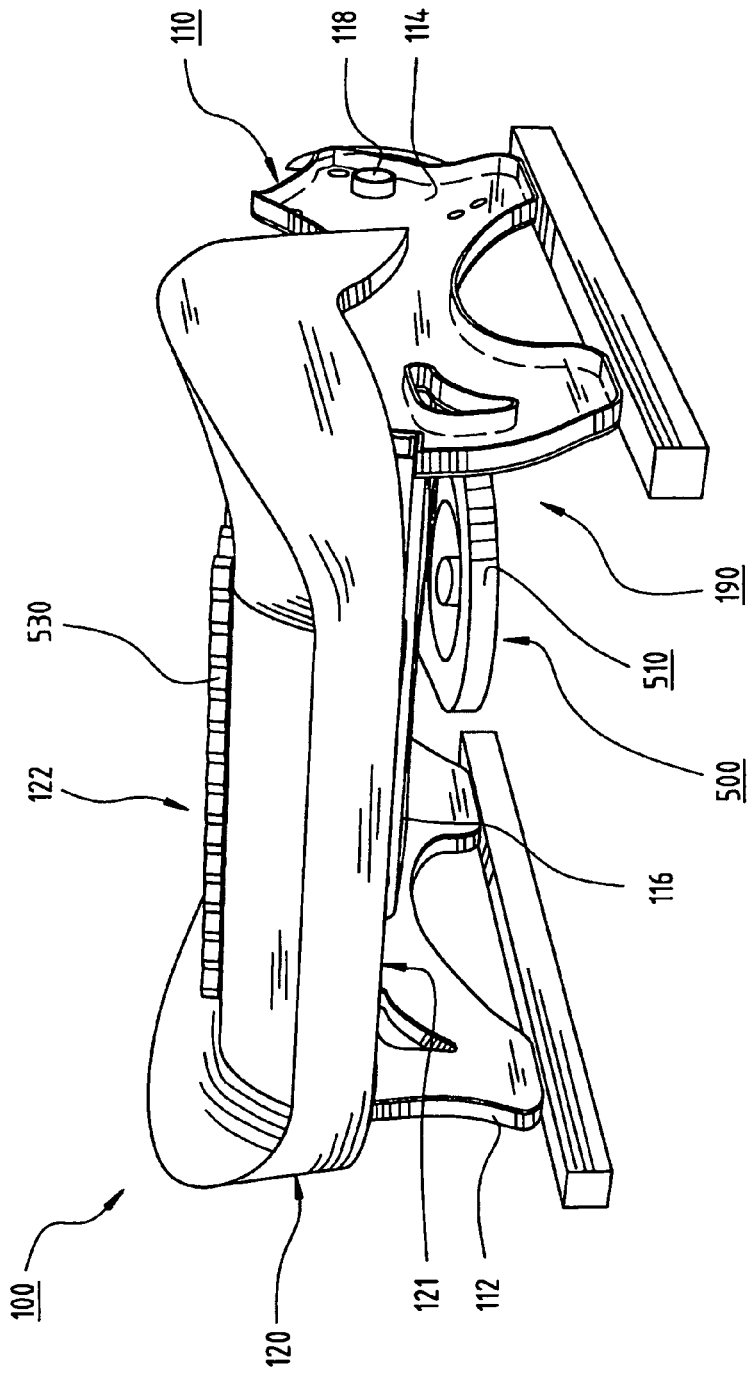
FIG. 1 is a perspective front view of a vehicle seat equipped with a ventilation apparatus in accordance with an embodiment.
Figure 2:
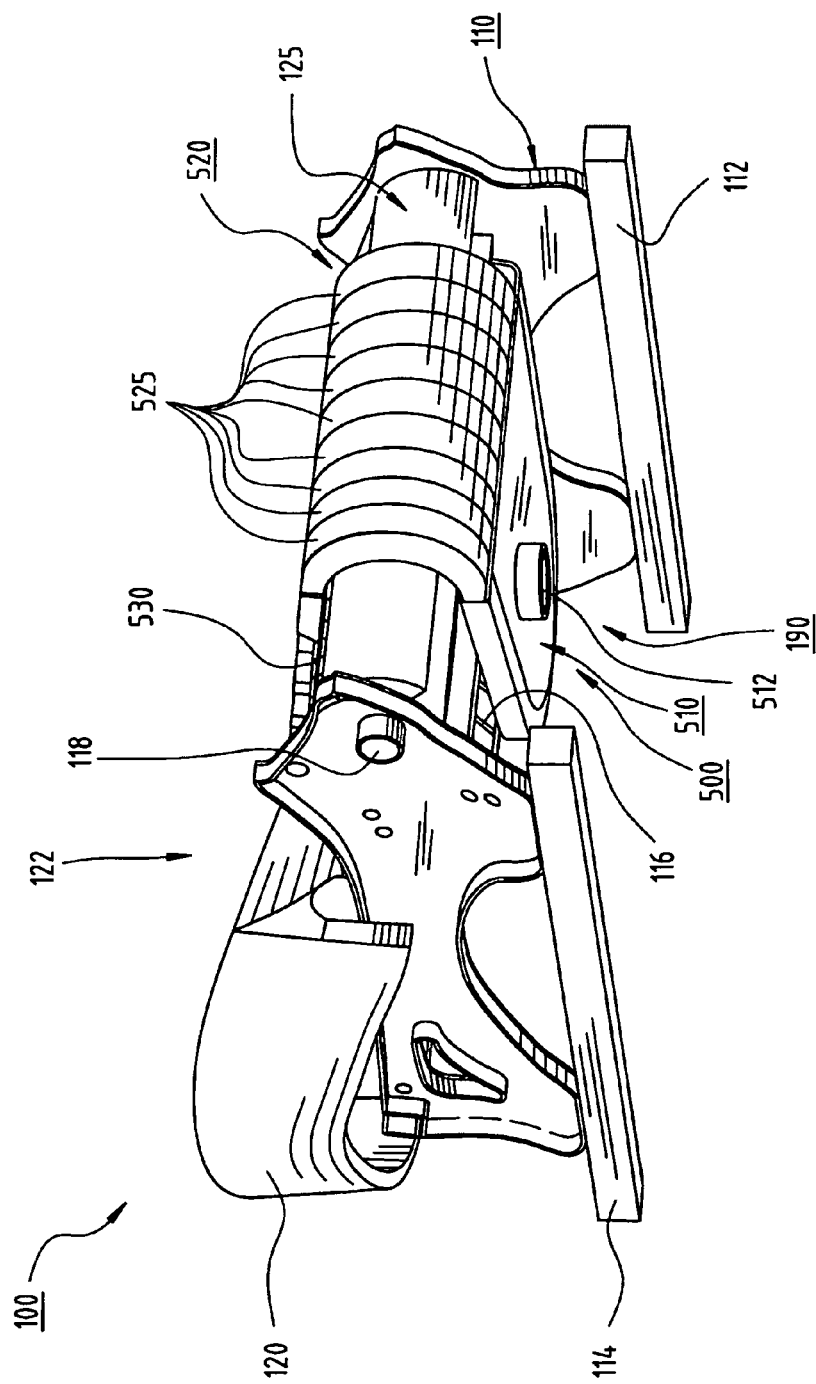
FIG. 2 is a perspective rear view of vehicle seat 100 having ventilation apparatus 500 of FIG. 1.
Figure 3:
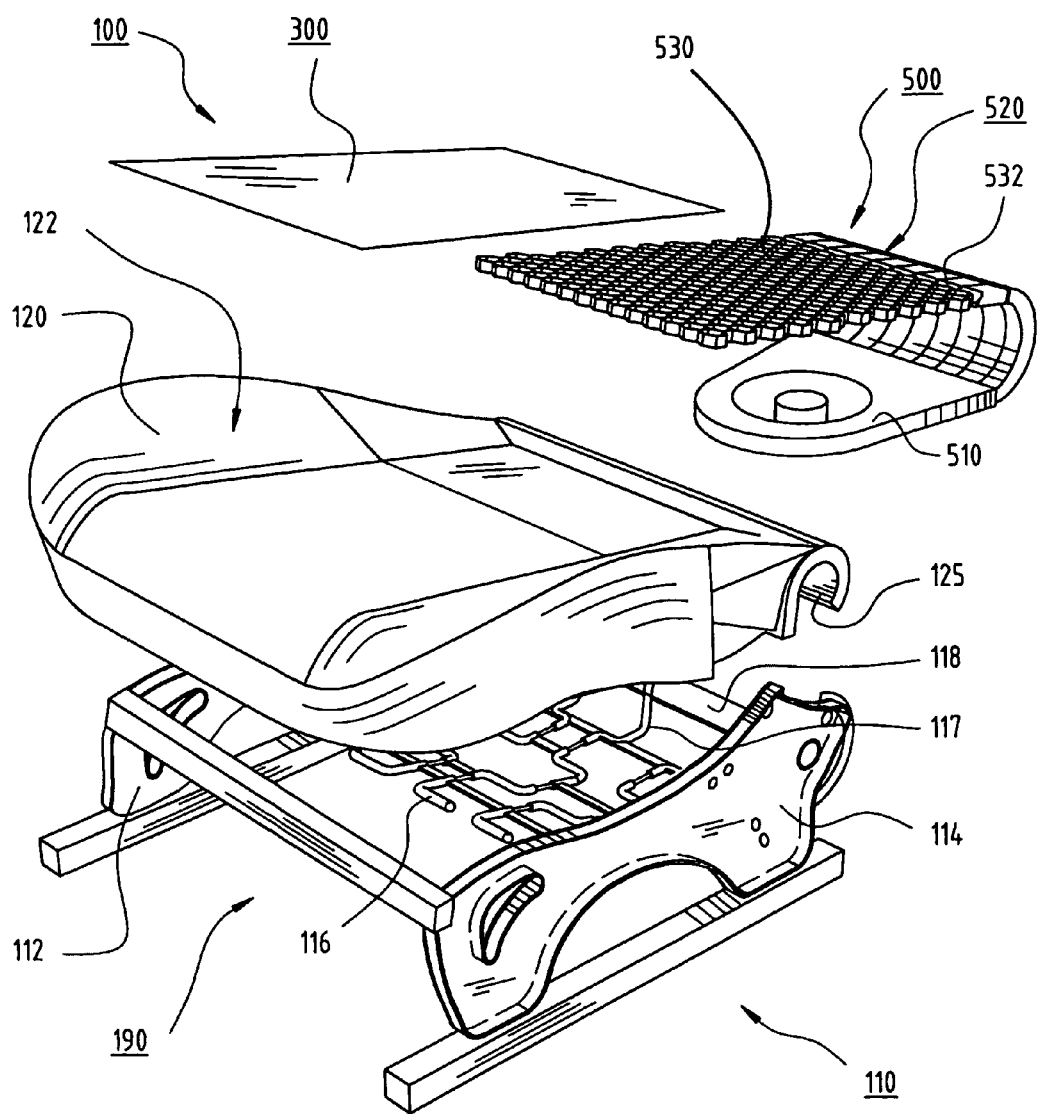
Figure 4:
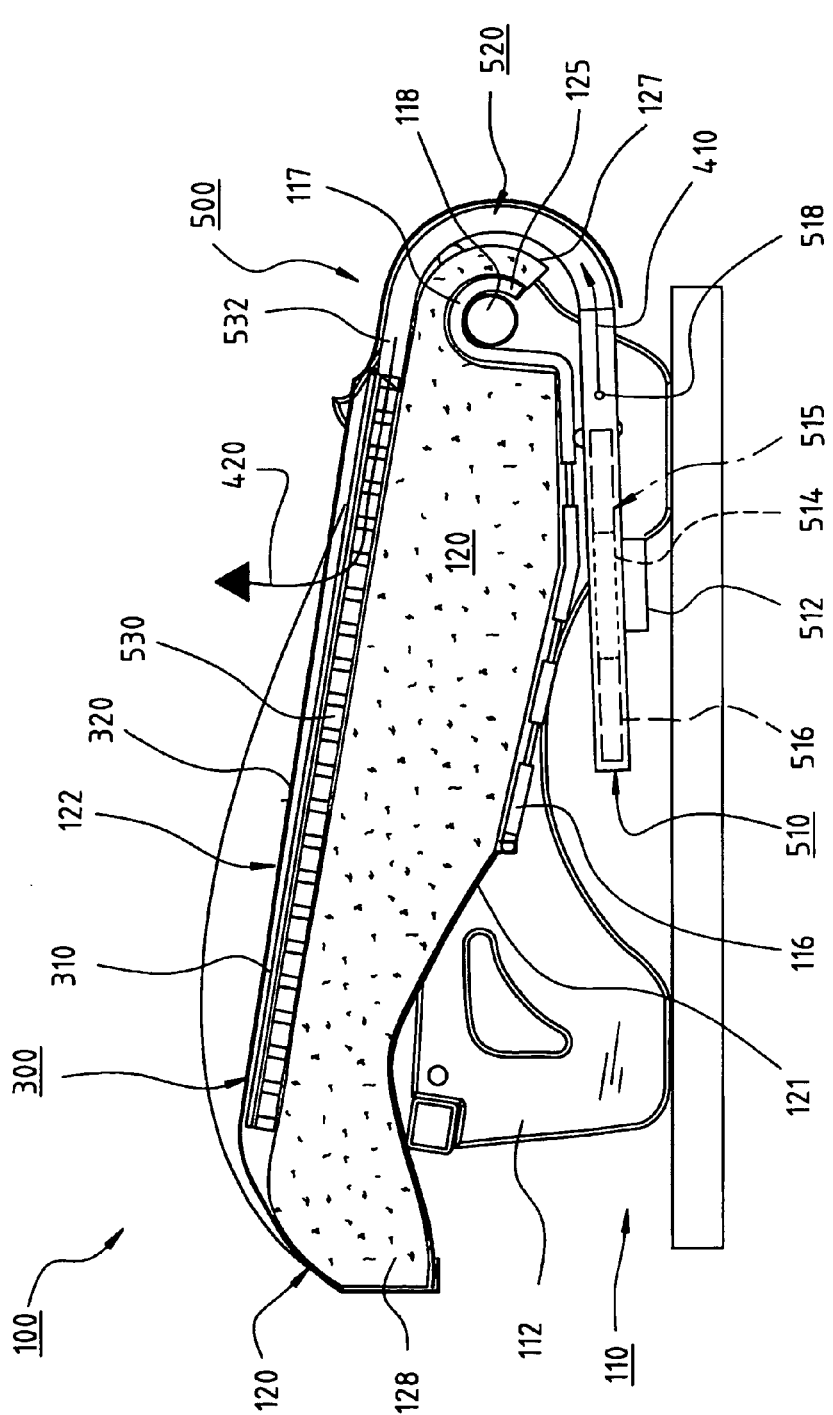
Figure 5:
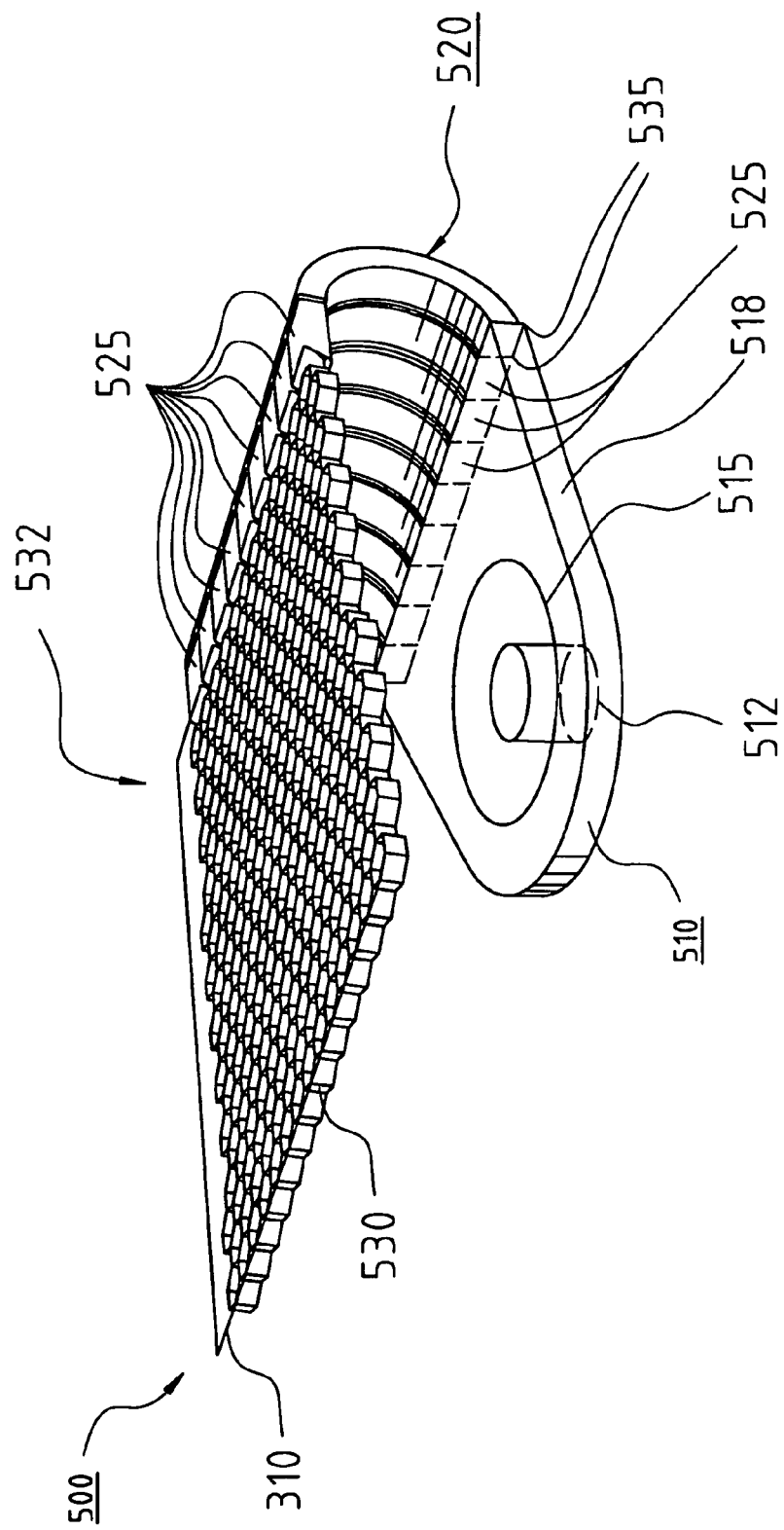

FIG. 3 is a perspective exploded view of vehicle seat 100 and of ventilation apparatus 500 in accordance with FIGS. 1 and 2;

FIG. 4 is a sectioned view of vehicle seat 100 and of ventilation apparatus 500 of FIGS. 1 to 3; and FIG. 5 is a perspective view of ventilation apparatus 500 of FIGS. 1 to 4.

DETAILED DESCRIPTION

In the description that follows, the terms "left," "right," "front," "back," "upper," and "lower" refer to the particular figure of the drawings, and can vary from one figure to the next, as a function of a particular orientation (portrait or landscape) that is selected. Identical or identically-functioning parts are labeled with the same reference characters in the various figures, and usually are described only once.

FIG. 1 is a front view of an exemplifying seat 100 that is implemented illustratively as a sports-car seat and comprises a ventilation apparatus 500 in accordance with an embodiment. Vehicle seat 100 has here a seat frame 110 on which is arranged a seat cushion 120 that forms a seating surface 122. Seat frame 110 has, by way of example, two lateral supports 112, 114 that are connected to one another via a tubular or rod-shaped connecting element 118 and a serpentine spring structure 116 on which an underside 121 of seat cushion 120 rests. Seat cushion 120 is arranged on seat frame 110 in such a way that underside 121 of seat cushion 120, and seat frame 110, form a cavity 190.

According to an embodiment, ventilation apparatus 500 serves for ventilation of seating surface 122 and comprises a fan module 510 equipped with a radial fan (515 in FIG. 4), as well as an air distribution arrangement 530. These are connected to one another, as described with reference to FIG. 2, via a connecting arrangement (520 in FIG. 2). Fan module 510 is preferably implemented with a flat structure and is arranged, by way of example, in cavity 190 adjacent the underside 121 of seat cushion 120.

Air distribution arrangement 530 is arranged on seat cushion 120 in the region of seating surface 122 implemented by the latter, and illustratively rests thereon.

FIG. 2 is a rear view of seat 100 of FIG. 1, with seat cushion 120 arranged on seat frame 110 and with ventilation apparatus 500. Seat cushion 120 has a rear face 127 that connects seating surface 122, implemented by seat cushion 120, to the latter's underside 121. Provided in the region of this rear face 127 is a fastening member 125 that is fastened, at least indirectly, on the tubular or rod-shaped connecting element 118 of seat frame 110, as described below with reference to FIG. 4, in order to prevent slippage of seat cushion 120 relative to seat frame 110.

According to an embodiment, fan module 510 of ventilation apparatus 500, which module is arranged in the region of underside 121 of seat cushion 120 in cavity 190 implemented by seat cushion 120 and seat frame 110, has an air inlet 512 and an air outlet 518. An approximately U-shaped connecting duct 520 extends around rear face 127 of seat cushion 120 from said outlet 518 to an inlet 532, provided for air delivery, of air delivery arrangement 530, and is hereinafter also referred to as an "air deflection device."

Air deflection device 520 serves to deflect the air stream (410 in FIG. 4) generated by fan module 510, and air distribution arrangement 530 serves for planar distribution of air stream 410 deflected by air deflection device 520, as described below with reference to FIG. 4.

Illustratively, air deflection device 520 is implemented in an approximately U-shaped manner in a region that, in the installed state as shown in FIG. 2, extends around rear face 127 of seat cushion 120. Multiple air conduits 525 are arranged in said device and are mechanically connected to one another (see FIG. 5). Webs 535 between conduits 525 prevent conduits 525 from collapsing when loaded, for example by a stretch cover of the seat.

According to an embodiment, air deflection device 520 therefore comprises, at least in portions thereof, next to one another over its entire extent, a plurality of air conduits 525 arranged at least approximately parallel to one another, which will hereinafter also be referred to as "air deflection conduits." These are at least locally mechanically connected to one another, at least some of air deflection conduits 525 each having an approximately rectangular cross section.

FIG. 3 shows an example of the installation of seat 100 of FIGS. 1 and 2. Firstly, the serpentine spring structure 116 is fastened on seat frame 110, in which context a mounting member 117, provided at the rear end of spring structure 116, is mounted on the tubular or rod-shaped connecting element 118 of seat frame 110. For this, mounting member 117 is implemented, by way of example, in resilient curved fashion, with an inside diameter that is less than or equal to the outside diameter of the tubular or rod-shaped connecting element 118, so that for mounting, mounting member 117 can be pressed onto connecting element 118 and, for example, latch-mounted there.

Seat cushion 120 is then mounted on seat frame 110, underside 121 of seat cushion 120 being positioned on the serpentine spring structure 116 of seat frame 110, and fastening member 125, provided adjacent the rear face 127 of the seat cushion, being fastened on the curved mounting member 117 of spring structure 116. For this, fastening member 125 is likewise configured, by way of example, in resilient curved fashion with an inside diameter that is less than or equal to the outside diameter of mounting member 117, so that for mounting, fastening member 125 can be pressed onto mounting member 118 and, for example, latch-mounted there.

In a further step, ventilation apparatus 500 (for example, preassembled), in which air deflection device 520 mounted at inlet 532 of air distribution arrangement 530 is arranged at outlet 518 of fan module 510, is arranged on seat cushion 120. For this, ventilation apparatus 500 is, for example, slid over rear face 127 of seat cushion 120 in such a way that air deflection device 520 fits around said rear face 127, as depicted in FIG. 4.

Air distribution arrangement 530 is positioned on seating surface 122, and fan module 510 is arranged in cavity 190 in the region of underside 121 of seat cushion 120.

According to an embodiment, air distribution arrangement 530 has a knitted textile spacer fabric. The 3 mesh® knitted spacer fabric of Müller Textil GmbH can, for example, be used as a knitted spacer fabric.

Lastly, an optional planar heating element 300 can be arranged on air distribution arrangement 530. Said element is, for example, equipped with heating coils 310 and is implemented to be air-permeable. According an embodiment, heating element 300 comprises an air-permeable foam, a felt, and/or a nonwoven fabric.

FIG. 4 is a sectioned view of seat 100 of FIG. 1, with seat cushion 120 that is arranged on seat frame 110 and comprises, by way of example, a suitable seat foam 128, and with ventilation apparatus 500 that is arranged on seat cushion 120 and has heating element 300. FIG. 4 illustrates the latch-mounting of mounting member 117 of the serpentine spring structure 116 on the tubular or rod-shaped connecting element 118 of seat frame 110, and of fastening member 125 of seat cushion 120 on mounting member 117. FIG. 4 moreover illustrates the manner of operation of ventilation apparatus 500, as described below.

According to an embodiment, fan module 510 comprises a radial fan 515, which is depicted schematically with a fan motor 514 and with a fan wheel 516. Air distribution arrangement 530 and heating element 300 are covered, illustratively, by a perforated cover material having an absorption ply.

When ventilation apparatus 500 is in operation, radial fan 515 is operated preferably in at least comparatively slow-rotating fashion and generates, from air that is drawn through inlet 512 into radial fan 515, an air stream 410 that is delivered via outlet 518 of fan module 510 to air deflection device 520. Air stream 410 is deflected there, and is delivered to air distribution arrangement 530 via the latter's inlet 532. Air distribution arrangement 530 distributes the delivered air stream over seating surface 122 fairly uniformly over a large area, as indicated by an arrow 420.

FIG. 5 shows ventilation apparatus 500 of FIGS. 1 to 4 without vehicle seat 100. FIG. 5 illustrates the air-permeable construction of air distribution arrangement 530, and the arrangement of air deflection conduits 525 in air deflection device 520.

Many variants and modifications are, of course, possible within the scope of the present invention.

What is claimed is:

1. A ventilation apparatus (500) adapted for installation on a seat (100) having a seat frame (110) and a seat cushion (120) supported by said seat frame, said cushion having an upper seating surface (122) and an underside (121), said seat frame (110) and said underside (121) together defining a cavity (190) underneath said seat (100);

wherein said ventilation apparatus (500) comprises:

a radial fan (515) mountable in said cavity (19) in a location adjacent said underside (121) of the seat cushion (120), which radial fan (515) has a housing formed with an air inlet (512) and an air outlet (518);

an air distribution arrangement (530) that is configured for installation adjacent the seating surface (122) of the seat cushion (120), that includes a knitted textile spacer fabric, and has an air inlet (532) for receiving, during operation, a flow of air to be applied to said seat (100); and an air deflection device (520) that extends from said air outlet (518) of the radial fan (515) to the air inlet (532) of the air distribution arrangement (530) and has a plurality of generally mutually parallel air deflection conduits (525), and wherein the seat cushion (120) has a rear face (127) and the air deflection device (520) has a generally U-shaped configuration, to thereby channel air, exiting from said radial fan, underneath said cushion, around said rear face (127), for application via said air distribution arrangement to said seating surface.

2. The ventilation apparatus of claim 1, wherein the air distribution arrangement (530) is configured to produce a planar distribution of air across said seating surface (122).

3. The ventilation apparatus according to claim 1, wherein said air deflection conduits (525) are, at least in portions thereof, mechanically connected to one another.

4. The ventilation apparatus of claim 2, wherein the air distribution arrangement (530) is configured to produce a planar distribution of air across said seating surface (122).

5. The ventilation apparatus of claim 3, further comprising a generally planar heating element (300), and wherein said air deflection device, during operation, directs a flow of air across said heating element (300).

6. The ventilation apparatus of claim 5, wherein the planar heating element (300) comprises an air-permeable material equipped with at least one heating coil (310).

7. The ventilation apparatus of claim 1, wherein at least some of the air deflection conduits (525) each have a generally rectangular cross-sectional shape.

8. The ventilation apparatus of claim 7, wherein the air distribution arrangement (530) is configured to produce a planar distribution of air across said seating surface (122).

9. The ventilation apparatus of claim 7, further comprising a generally planar heating element (300), and
wherein said air deflection device, during operation, directs a flow of air across said heating element (300).

10. The ventilation apparatus of claim 9, wherein the planar heating element (300) comprises an air-permeable material equipped with at least one heating coil (310).

11. A ventilation apparatus (500) adapted for installation on a seat (100) having a seat frame (110) and a seat cushion (120) supported by said seat frame,
said cushion having an upper seating surface (122) and an underside (121), said seat frame (110) and said underside (121) together defining a cavity (190) underneath said seat (100);
wherein said ventilation apparatus (500) comprises:
a radial fan (515) mountable in said cavity (19) in a location adjacent said underside (121) of the seat cushion (120), which radial fan (515) has a housing formed with an air inlet (512) and an air outlet (518);
an air distribution arrangement (530) that is configured for installation adjacent the seating surface (122) of the seat cushion (120) and has an air inlet (532) for receiving, during operation, a flow of air to be applied to said seat (100); and
an air deflection device (520) that extends from said air outlet (518) of the radial fan (515) to the air inlet (532) of the air distribution arrangement (530) and has a plurality of generally mutually parallel air deflection conduits (525), at least some of which each have a generally rectangular cross-sectional shape,
and wherein the seat cushion (120) has a rear face (127) and the air deflection device (520) has a generally U-shaped configuration, to thereby channel air, exiting from said radial fan, underneath said cushion, around said rear face (127), for application via said air distribution arrangement to said seating surface.

12. The ventilation apparatus according to claim 11, wherein said air deflection conduits (525) are, at least in portions thereof, mechanically connected to one another.

13. The ventilation apparatus of claim 11, further comprising a generally planar heating element (300), and
wherein said air deflection device, during operation, directs a flow of air across said heating element (300).

14. The ventilation apparatus of claim 13, wherein the planar heating element (300) comprises an air-permeable material equipped with at least one heating coil (310).

15. A ventilation apparatus (500) adapted for installation on a seat (100) having a seat frame (110) and a seat cushion (120) supported by said seat frame,
said cushion having an upper seating surface (122) and an underside (121), said seat frame (110) and said underside (121) together defining a cavity (190) underneath said seat (100);
wherein said ventilation apparatus (500) comprises:
a radial fan (515) mountable in said cavity (19) in a location adjacent said underside (121) of the seat cushion (120), which radial fan (515) has a housing formed with an air inlet (512) and an air outlet (518);
an air distribution arrangement (530) that is configured for installation adjacent the seating surface (122) of the seat cushion (120) and has an air inlet (532) for receiving, during operation, a flow of air to be applied to said seat (100);
a generally planar heating element (300); and
an air deflection device (520) that extends from said air outlet (518) of the radial fan (515) to the air inlet (532) of the air distribution arrangement (530) and has a plurality of generally mutually parallel air deflection conduits (525), which, during operation, direct a flow of air across said heating element (300),
and wherein the seat cushion (120) has a rear face (127) and the air deflection device (520) has a generally U-shaped configuration, to thereby channel air, exiting from said radial fan, underneath said cushion, around said rear face (127), for application via said air distribution arrangement to said seating surface.

16. The ventilation apparatus of claim 15, wherein the planar heating element (300) comprises an air-permeable material equipped with at least one heating coil (310).

17. The ventilation apparatus according to claim 15, wherein said air deflection conduits (525) are, at least in portions thereof, mechanically connected to one another.

18. A ventilation apparatus (500) adapted for installation on a seat (100) having a seat frame (110) and a seat cushion (120) supported by said seat frame,
said cushion having an upper seating surface (122) and an underside (121), said seat frame (110) and said underside (121) together defining a cavity (190) underneath said seat (100);
wherein said ventilation apparatus (500) comprises:
a radial fan (515) mountable in said cavity (19) in a location adjacent said underside (121) of the seat cushion (120), which radial fan (515) has a housing formed with an air inlet (512) and an air outlet (518);
an air distribution arrangement (530) that is configured for installation adjacent the seating surface (122) of the seat cushion (120) and has an air inlet (532) for receiving, during operation, a flow of air to be applied to said seat (100); and
an air deflection device (520) that is formed with a first opening mounted adjacent said air outlet (518) of the radial fan (515), is formed with a second opening mounted adjacent said air inlet (532) of the air distribution arrangement (530), and has a plurality of generally mutually parallel air deflection conduits (525),
and wherein the seat cushion (120) has a rear face (127) and the air deflection device (520) has a generally U-shaped configuration, which fits around said rear face (127) of said seat cushion (120) to thereby channel air, exiting from said radial fan, underneath said cushion, around said rear face (127), for application via said air distribution arrangement to said seating surface (122).

19. The ventilation apparatus of claim 18,
further comprising a generally planar heating element (300),
wherein said air deflection device, during operation, directs a flow of air across said heating element (300), and
wherein the planar heating element (300) comprises an air-permeable material equipped with at least one heating coil (310).

* * * * *